G. FREEMAN ET AL 3,564,424
DIGITAL PHASE LOCKED LOOP
Filed May 15, 1968
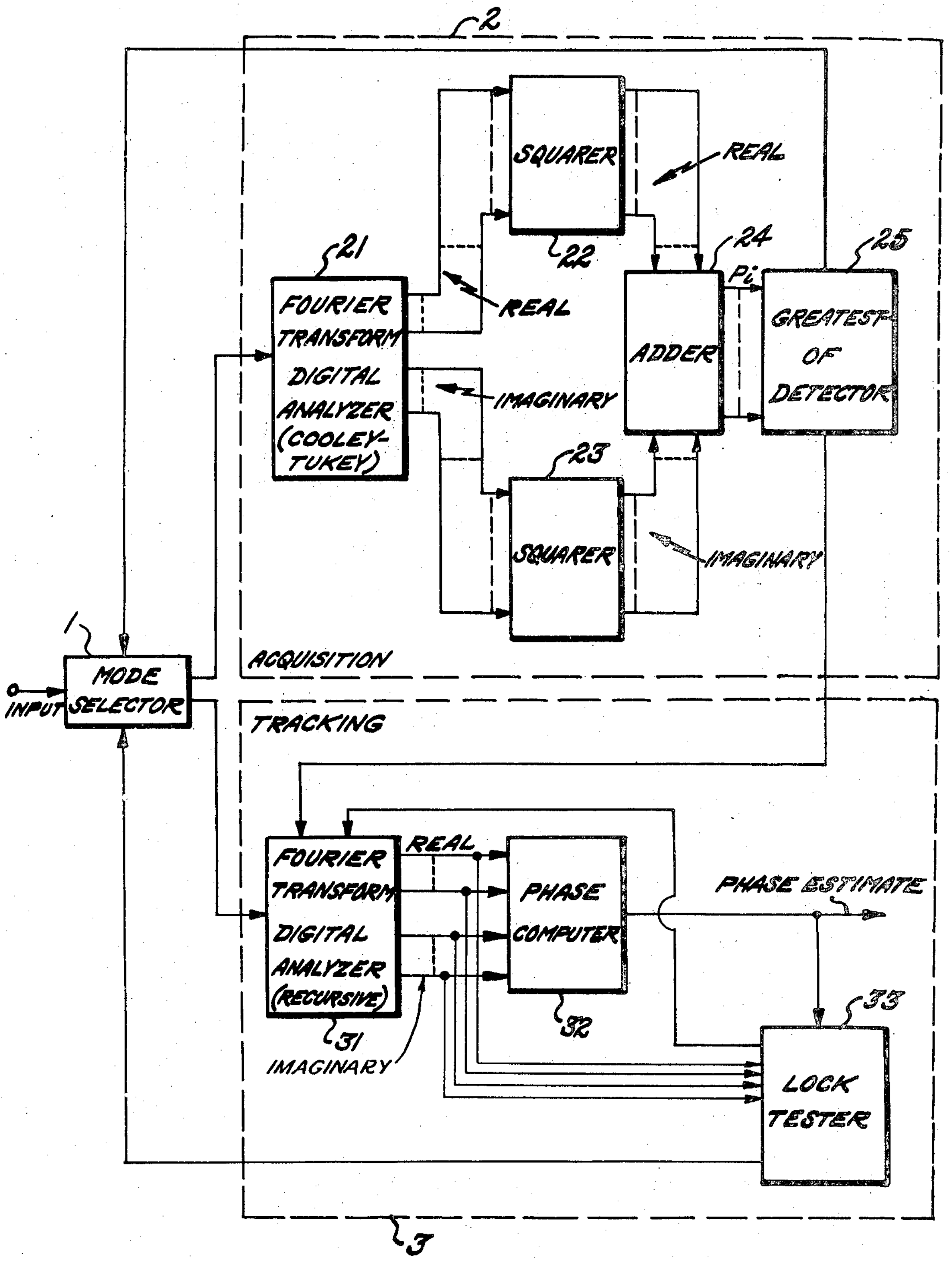
INVENTORS
DON G. FREEMAN
RICHARD van BLERKOM
RICHARD G. CRUTCHFIELD
BY Julian L. Siegel
ATTORNEY United States Patent Office 3,564,424

Patented Feb. 16, 1971

3,564,424

DIGITAL PHASE LOCKED LOOP

Don G. Freeman, Gaithersburg, Richard Van Blerkom, Rockville, and Richard C. Crutchfield, Jr., Potomac, Md., assignors to the United States of America as represented by the Secretary of the Air Force Filed May 15, 1968, Ser. No. 729,331
Int. Cl. H04b 1/36
U.S. Cl. 325—468 2 Claims

ABSTRACT OF THE DISCLOSURE

A digital phase locked loop in which in an acquisition mode an analyzer using a Cooley-Tukey algorithm resolves an input signal into real and imaginary components and the component of highest power is determined. Then in the tracking mode a second analyzer performs a Fourier transform using a recursive relationship on the input signal only in the neighborhood of the largest spectral component. The phase is determined and tested for the largest component and the mode selector is adjusted accordingly.

BACKGROUND OF THE INVENTION

This invention relates to a digital receiver and more particularly to a digital phase locked loop.

A digital receiver is a device that performs the same function as an analog communications or radar receiver, but uses more digital circuitry. A digital receiver may have components such as digital filters which are directly analogous to their analog equivalents. It may also have components which perform the receiver function by completely different operations. In essence, a digital receiver samples the signal near the front end and then uses digital techniques to extract the modulated information from the carrier and noise. In principle it is possible to utilize a digital receiver in systems that employ either analog or digital modulation. In fact, it is not unreasonable to design special signals for transmission that would be most amenable to digital reception. However, this invention pertains solely to the digital reecption of standard analog isgnals. It is assumed that the word "receiver" in "digital receiver" implies that the information derived from the received signal is desired either immediately or after a small delay. In terms of digital processing, this real-time constraint means that the digital operations on the input signal must be simple.

This invention utilizes the digital implementation of the phase locked loop. Numerous so-called digital phase locked loops have been proposed in the past. However, in each case the device actually was a digitally controlled phase locked loop that still processed analog signals. The technique of the present invention processes digital data directly.

Previous attempts at designing digital phase locked loops have failed because the design has always involved replacing the analog device by its direct digital equivalent. It is a serious mistake to use a direct equivalent, since this process results in carrying the limitations of the analog device over to the digital world. The digital device is invariably very complex and thus impractical. The digital circuit must be designed in such a way as to make full use of the advantages of digital circuitry just as the analog circuit designers have always done.

SUMMARY OF THE INVENTION

A phase locked loop operates in either an acquisition or a tracking mode. The novelty of the digital phase locked loop of the invention results from observing the functional operations that are performed in these two modes and applying the appropriate digital techniques. A practical digital implementation is disclosed that makes use of numerical techniques that appear to be completely unrelated to the phase locked loop problem.

In the acquisition mode, one must recognize that the function performed by a phase locked loop is that of determining the largest spectral component of the received signal. An analog loop performs this operation in essence by scanning a narrow band filter over the frequency range until an energy threshold is exceeded. This of course is not ideal since the loop could lock at least temporarily on a noise component.

The ideal strategy for the acquisition problem is to compute the complete power density spectrum and pick the largest spectral component. The power spectrum operation involves a Fourier transform that is normally very complex to implement. However, a recently developed technique called the Cooley-Tukey algorithm eliminates this objection. If N data samples are used in the Fourier transform the direct method requires $N^2$ multiply and sum operations while the Coley-Tukey algorithm requires only $2 N \log_2 N$ operations.

During the acquisition mode it is necessary for all the spectral components of the input signal to be computed. However, once the phase locked loop has acquired lock and goes into the tracking mode, only spectral lines in the vicinity of the largest spectral line need be computed. The number of frequency components needed will depend on the maximum rate of change of the frequency of the signal. Given that only a few of the spectral components are needed for tracking the simplest approach is to use an algorithm that performs the direct transform by an updating procedure. At each sample time, all but one of the N data samples are the same. It is therefore possible to use a recursive form of the direct Fourier transform that requires only one operation for each spectral component needed.

It is therefore an object of the invention to provide a novel digital phase locked loop.

It is another object to provide a digital phase locked loop that processes digital data directly.

It is another object to provide a digital phase locked loop that uses an improved method of computing the power spectrum.

These and other advantages, features and objects of the invention will become more apparent from the following description taken in connection with the illustrative embodiment in the accompanying drawing, wherein:

DESCRIPTION OF THE DRAWING

The sole figure is a block diagram showing an embodiment of the invention.

DESCRIPTION OF THE PREFERRED EMBODIMENT

The input signal is switched by mode selector 1 either into acquisition logic 2 or tracking logic 3. If the receiver is initially in the acquisition mode, then N data samples are accummulated and the Fourier transform is performed by analyzer 21 which is implemented by a Cooley-Tukey algorithm. A discussion of the Cooley-Tukey algorithm can be found in the IEEE Spectrum, page 63, December 1967. The output of this analyzer which represents amplitude is a set of N real spectral components ($a_i$ for $i=1, 2 \ldots N$) and N imaginary spectral components ($b_i$ for $i=1, 2 \ldots N$). These output numbers are squared by squarers 22 and 23 and summed by adder 24, which adds the squared real parts to the squared imaginary parts, to form an estimate of the power density function of an input signal. The power in the $i^{th}$ spectral component is $$P_i=(a_i^2+b_i^2)$$

Greatest-of detector 25 selects the largest spectral component of $P_i$ denoted by Max ($P_i$). The greatest-of detector 25 selects the largest output of adder 24. For example, let $P_i$ be the set of numbers $P_1=3$, $P_2=5$, $P_3=7$, and $P_4=2$. The greatest-of detector 25 simply scans the four numbers and recognizes that $P_3$ is the largest. The value of $i$ associated with Max ($P_i$) is transmitted to the tracking Fourier transform digital analyzer 31 and mode switch 1 is switched to the tracking logic 3. A program for the transformer entitled, "Recursive, Complex Fourier Analysis for Real-Time Applications," by J. H. Halberstein, can be found in IEEE Proceeding Letters, 1966, page 903.

In this mode, the Fourier transform is performed by digital analyzer 31 at each sample time by a recursive relationship. The Cooley-Tukey algorithm is not used in this case since all N complex spectral components must be computed while the recursive relationship allows any number of the components to be computed. For tracking purposes, one need only compute several spectral components in the vicinity of Max ($P_i$). At each sample time a phase of the spectral component is computed by phase computer 32 which is fed by signals from analyzer 31 representing real and imaginary values. The phase is given by $$\phi=\text{arc tan}\left[\frac{\text{Imaginary}}{\text{Real}}\right]$$

In addition, at each sample time the estimate of Max ($P_i$) must be updated and this information fed back into recursive transform digital analyzer 31. This function is performed as part of the test for lock procedure by lock tester 33 which is fed by the output of analyzer 31 and phase computer 32. This test for lock procedure involves computing the $P_i$ for each value of $i$ for each set of $a_i$ and $b_i$ computed by the recursive Fourier transform. If there exists a predominant power spectral component, it is designated as Max ($P_i$) and fed back in the Fourier transform. If a predominant component is not present, the digital phase locked loop is assumed to be out of lock and the mode selector is switched to the acquisition mode by mode selector 1.

Although the invention has been described with reference to a particular embodiment, it will be understood to those skilled in the art that the invention is capable of a variety of alternative embodiments within the spirit and scope of the appended claims.

I claim:

1. A digital phase locked loop comprising:

(a) a mode selector fed by a received signal;

(a) a first Fourier transform digital analyzer fed by the mode selector and having a plurality of output signals representing real and imaginary values;

(c) a first and second squaring means fed by the real and the imaginary signals respectively from the digital analyzer;

(d) means for adding the squared real and imaginary spectral components forming a plurality of sums;

(e) a greater-of detector fed by the adding means for determining a spectral component having the greatest power, the detector having one output fed to the mode selector;

(f) a recursive Fourier transform digital analyzer fed by the greater-of detector and the input signal from the mode selector, the analyzer having output signals corresponding to real and imaginary values representing a Fourier transform on the input signal only in the area of the largest spectral component;

(g) means for computing the phase fed by the recursive digital analyzer;

(h) and a lock tester fed by the phase computing means and the recursive digital analyzer.

2. A digital phase locked loop according to claim 1 wherein the first digital analyzer includes means for performing Cooley-Tukey algorithm Fourier transforms.

References Cited

UNITED STATES PATENTS

| | | | |
|---|---|---|---|
| 3,177,349 | 4/1965 | Zaborszky et al. | 235—152 |
| 3,446,949 | 5/1969 | Trimble | 235—152 |

OTHER REFERENCES

Proceedings of the IEEE; vol. 55, No. 10, October 1967; pp. 1675–1677.

RICHARD MURRAY, Primary Examiner

B. V. SAFOUREK, Assistant Examiner

U.S. Cl. X.R.

324—77; 325—332